(12) United States Patent
Gal-Oz (10) Patent No.: US 7,584,341 B2
(45) Date of Patent: Sep. 1, 2009

(54) METHOD FOR DEFRAGMENTING OF VIRTUAL VOLUMES IN A STORAGE AREA NETWORK (SAN)

(75) Inventor: Shaul Gal-Oz, Palo Alto, CA (US)

(73) Assignee: Sanrad, Ltd., Mountain View, CA (US)

( * ) Notice: Subject to any disclaimer, the term of this patent is extended or adjusted under 35 U.S.C. 154(b) by 301 days.

(21) Appl. No.: 11/544,213

(22) Filed: Oct. 6, 2006

(65) Prior Publication Data

US 2007/0113036 A1  May 17, 2007

Related U.S. Application Data

(60) Provisional application No. 60/736,805, filed on Nov. 12, 2005.

(51) Int. Cl.
  *G06F 12/10* (2006.01)

(52) U.S. Cl. .................................... 711/202; 711/203
(58) Field of Classification Search .................... None
  See application file for complete search history.

(56) References Cited

U.S. PATENT DOCUMENTS

2005/0216665 A1* 9/2005 Takakuwa ................. 711/114

* cited by examiner

*Primary Examiner*—Hyung S Sough
*Assistant Examiner*—Ngoc V Dinh
(74) *Attorney, Agent, or Firm*—Myers Wolin, LLC (57) ABSTRACT

A defragmentation method and system to overcome fragmentation of virtual volumes in storage area networks (SANs). The method includes combining and migrating fragments of data spread over multiple storage areas in order to increase storage space utilization and optimize access time to storage. By defragmenting virtual volumes both performance and storage utilization is significantly improved.

26 Claims, 6 Drawing Sheets

METHOD FOR DEFRAGMENTING OF VIRTUAL VOLUMES IN A STORAGE AREA NETWORK (SAN)

CROSS REFERENCE TO RELATED APPLICATIONS

This application claims priority from U.S. provisional application No. 60/736,805 filed on Nov. 15, 2005, the disclosure of which is incorporated herein by reference.

FIELD OF THE INVENTION

The present invention relates generally to storage area networks (SANs) and, more particularly, to a method for defragmenting virtual volumes in SANs.

BACKGROUND OF THE INVENTION

The rapid growth in data intensive applications continues to fuel the demand for raw data storage capacity. As a result, there is an ongoing need to add more storage, file servers, and storage services to an increasing number of users. To meet this growing demand, the concept of storage area network (SAN) was introduced. A SAN is defined as a network having the primary purpose of the transfer of data between computer systems (hosts) and storage devices. In a SAN environment, storage devices and servers are generally interconnected through various switches and appliances. This structure generally allows for any server on the SAN to communicate with any storage device and vice versa. It also provides alternative paths from a server to a storage device.

To increase the utilization of SANs, extend the scalability of storage devices, and increase the availability of data, the concept of storage virtualization has recently developed. Storage virtualization offers the ability to isolate a host from the diversity of storage devices. The result is a substantial reduction in support effort and end-user impact.

Figure 1:
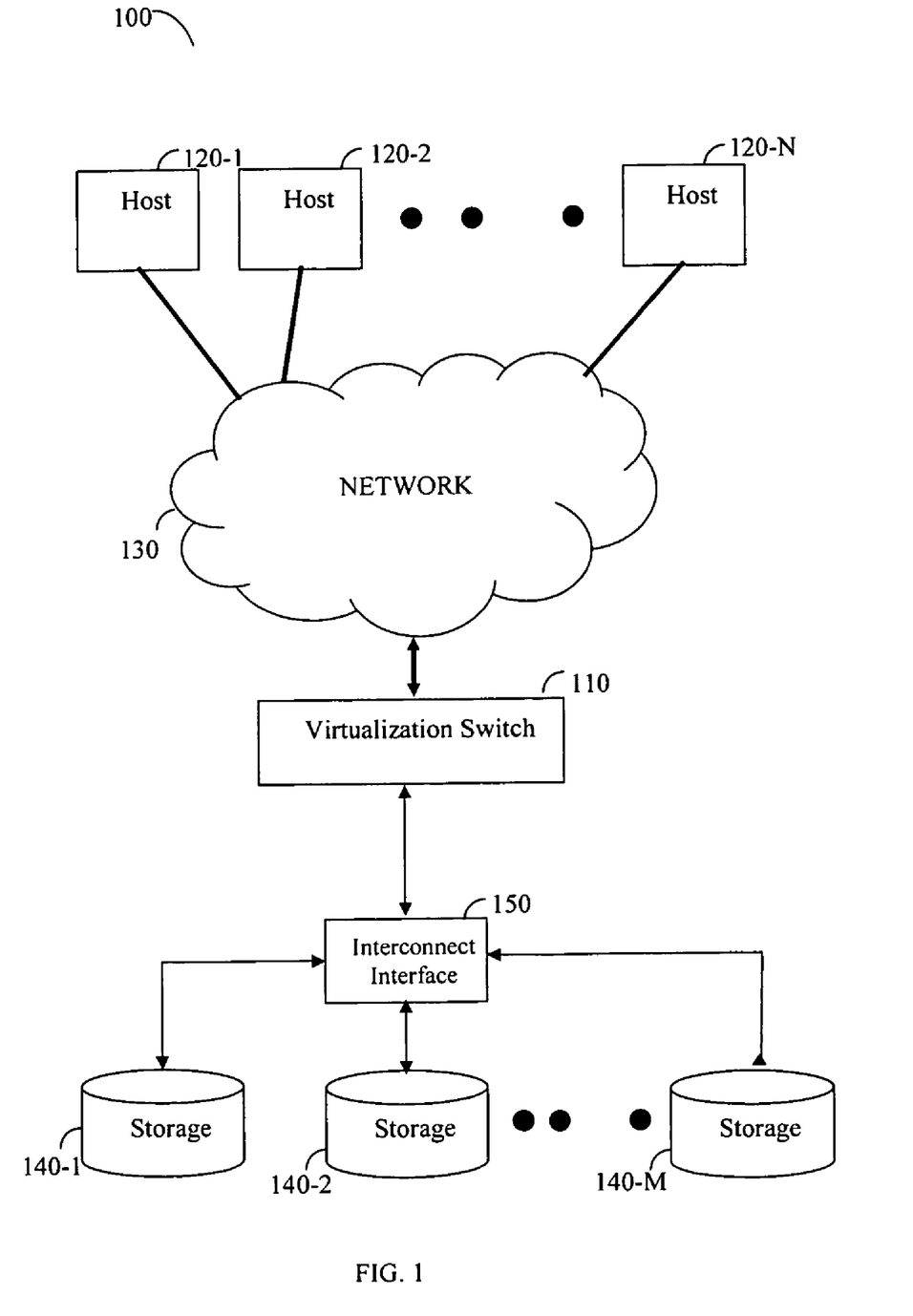
FIG. 1—is an exemplary description SAN including a virtualization switch useful for explaining the present invention.

FIG. 1 shows a SAN 100 that enables storage virtualization operations and includes a virtualization switch 110. Virtualization switch 110 is connected to a plurality of hosts 120 through a network 130, for example a local area network (LAN), a metro area network (MAN), or a wide area network (WAN). The connections formed between the hosts and the virtualization switches can utilize any protocol including, but not limited to, Gigabit Ethernet carrying packets in accordance with the internet small computer systems interface (iSCSI) protocol, Infiniband protocol, and others. Virtualization switch 110 is further connected to a plurality of storage devices 140 through an interconnect interface 150, such as, SCSI, Fibre Channel (FC), Parallel SCSI (P.SCSI), iSCSI, Serial Attached SCSI (SAS), and others that would be readily apparent to those of skill in the art.

Virtualization of a SAN essentially means mapping of a virtual volume address space to an address space on one or more physical storage devices 140. Specifically, a virtual volume can be anywhere on one or more physical storage devices including, but not limited to, a disk, a tape, and a redundant array of independent disks (RAID), that are connected to a virtualization switch. Furthermore, a virtual volume consists of one or more logical units (LUs), each identified by a logical unit number (LUN). LUNs are frequently used in the iSCSI and FC protocols and are generally configured by a system administrator. Each LU, and hence each virtual volume, is generally comprised of one or more contiguous partitions of storage space on a one or more physical storage devices 140. Thus, a virtual volume may occupy a whole storage device 140, a part of a single storage device 140, or parts of multiple storage devices 140. The physical storage devices 140, the LUs and their exact locations, are transparent to the user. To execute the virtualization services virtualization switch 110 maintains a mapping scheme that defines relations between the virtual volumes, the LUs, and the physical storage devices. A virtual volume may be any kind of volume including, but is not limited to, a concatenation volume, a stripe volume, a mirror volume, a simple volume, a snapshot volume, or any combination thereof. A virtual volume may further include one or more volumes of the above types.

Virtual volumes are generally created by allocating storage space to LUs on physical storage devices 140. Generally, the allocation can be performed automatically or manually by a system administrator in order to achieve good performance, full control of the SAN resources, and optimal storage utilization. For example, the system administration may create virtual volumes to achieve low latency when accessing a virtual volume. For this purpose, LUs of a virtual volume are allocated on a low-latency disk or a disk array that is physically located close to the host, to accomplish minimal number of hops and minimal delay when reading or writing data. However, during normal operation, after many allocation and de-allocation of storage space, the virtual volumes end up fragmented with many data blocks of its respective LUs spread over storage devices 140 with small gaps between them. In addition, fragmented volumes may be generated by an automatic process that, on one hand, may reduce the configuration time and complexity, but on the other hand may create sub-optimal fragmented volumes.

To solve problems involved with fragmented volumes it would be therefore advantageous to provide a method that automatically defragments SANs.

DETAILED DESCRIPTION OF THE INVENTION

The defragmentation method disclosed herein is designed to avoid fragmentation of virtual volumes in storage area networks (SANs). Accordingly, the method automatically combines and migrates fragments of data spread over multiple disks to form optimized volumes. Fragments are data blocks that belong to logical units (LUs) of respective virtual volumes. By defragmenting virtual volumes the present invention significantly improves the performance and storage utilization of SANs.

Figure 2A:
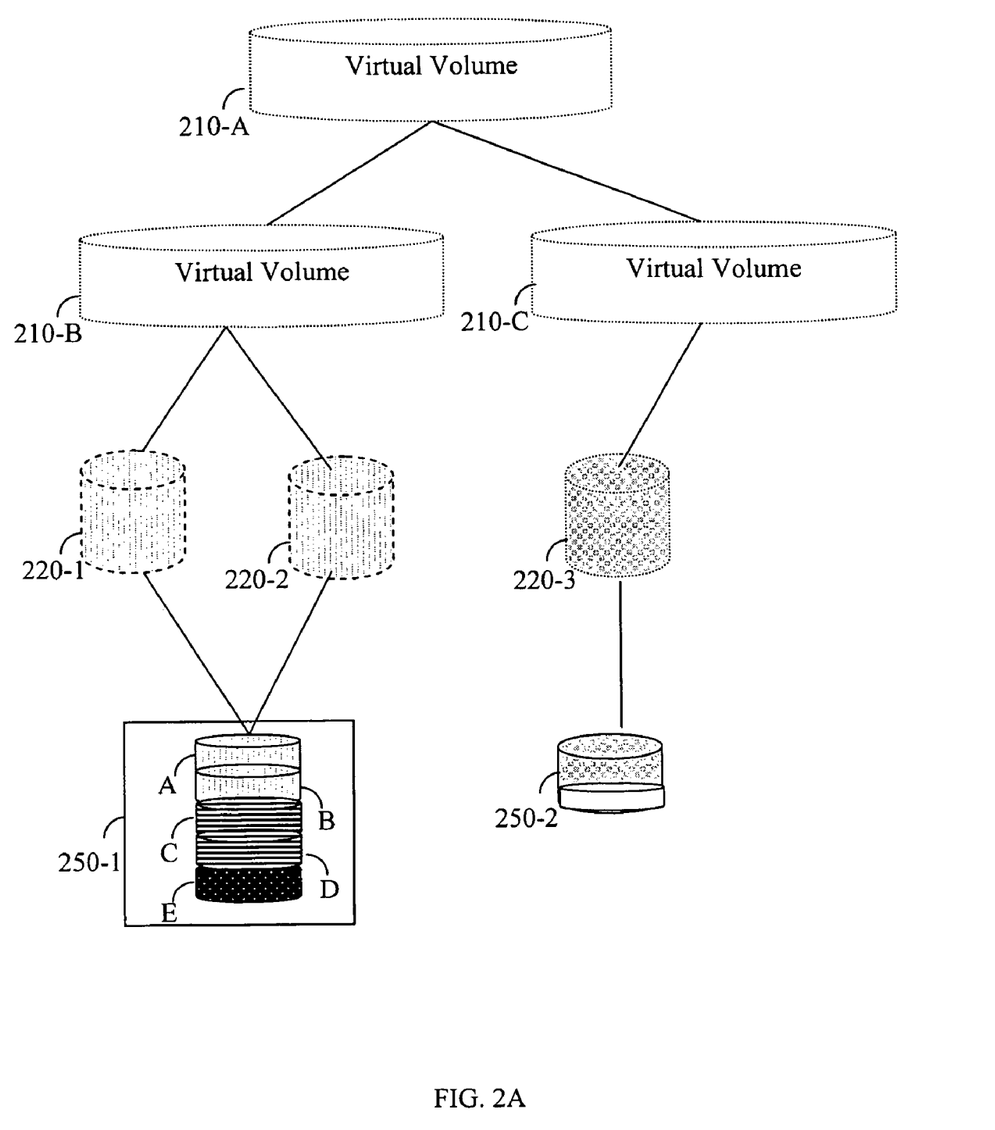
FIGS. 2A, 2B, 2C—are illustrations of virtual volumes' hierarchy used for describing the principles of the present invention FIG. 3—is a flowchart describing the method for defragmenting virtual volumes in accordance with one embodiment of the present invention FIG. 4—is a flowchart describing the method for combining and migrating fragments in accordance with an embodiment of the present invention

Reference is now made to FIG. 2A that illustrates virtual volumes' hierarchy as defined in a SAN. Note that similar types of data are shown with similar shading. Three virtual volumes 210-A, 210-B and 210-C are shown. Virtual volume 210-A is a mirror set of the two other virtual volumes 210-B and 210-C. Virtual volume 210-B is a concatenation of two LUs 220-1 and 220-2. Virtual volume 210-C is a simple volume of LU 220-3. A LU is defined as a plurality of continuous data blocks having the same block size. The virtual address space of a virtual volume resides between '0' to the maximum capacity of the data blocks defined by the LUs. The LUs and the virtual volumes typically have the same virtual address spaces. For example, if the virtual address space of virtual volume 210-A is 0000-1000, since virtual volumes 210-B and 210-C are mirror set of 210-A, they both have virtual address spaces of 0000-1000. Given that virtual volume 210-B is a concatenation of LUs 220-1 and 220-2, the address spaces of LUs 220-1 and 220-2 are 0000-0500 and 0500-1000, respectively. The address space of LU 220-3 is also 0000-1000. The physical address spaces of the storage occupied by LUs 220-1, 220-2, and 220-3 is denoted by the physical address of the data blocks. However, in this example, the capacity of the storage occupied by these LUs is at most 1000 blocks. In accordance with this example, LUs 220-1 and 220-2 are allocated to a physical RAID 250-1 and LU 220-3 is allocated to a disk 250-2. RAID 250-1 includes five disks, A through E, where disks A and B are occupied by LUs 220-1 and 220-2 and disks C, D, and E are used by other LUs (not shown).

Figure 2B:
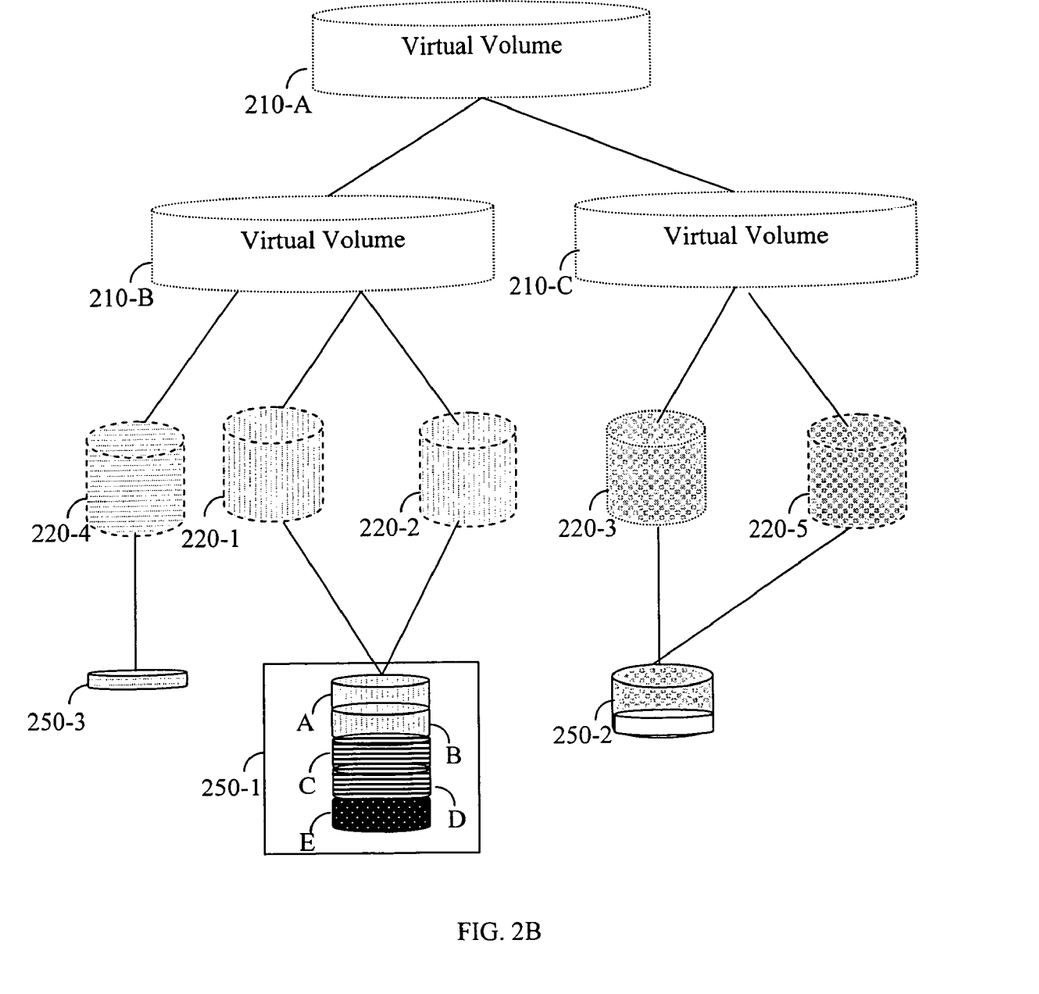
Figure 2C:
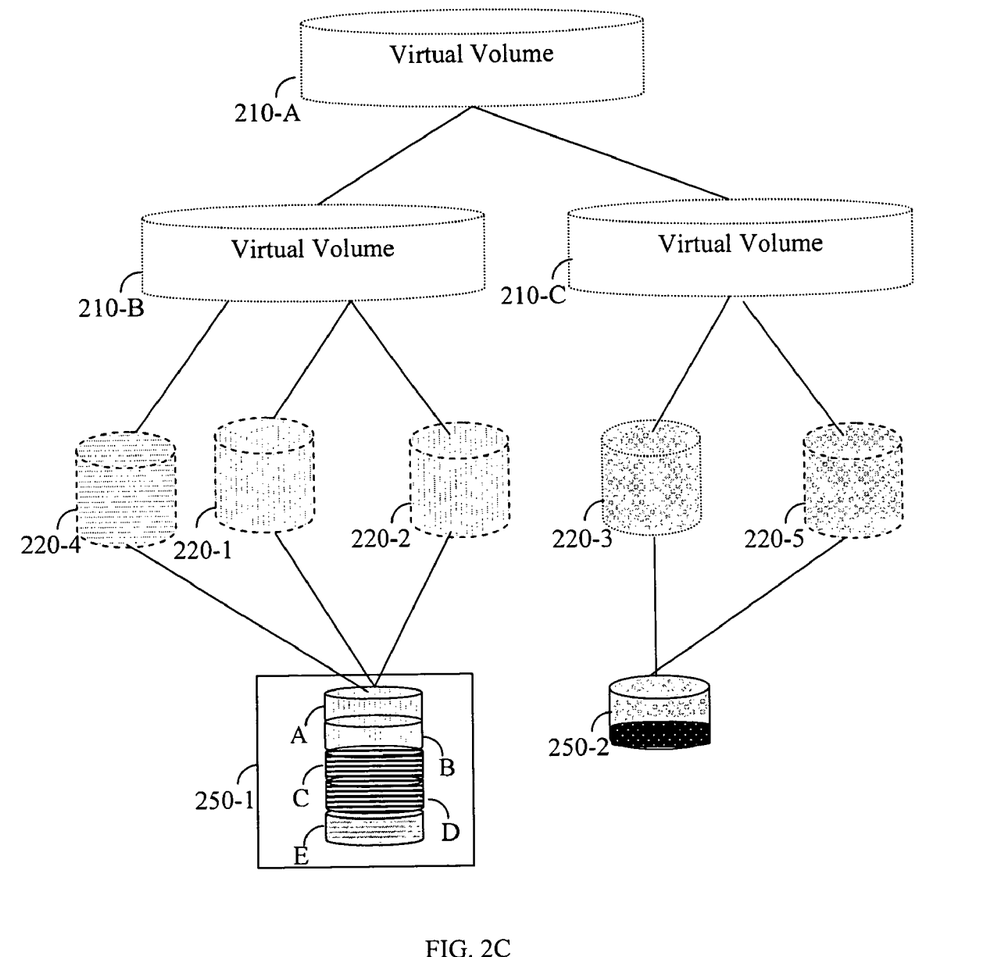

If additional storage is required the system administrator may allocate, for example, an extra 500 blocks for mirror volume 210-A. As illustrated in FIG. 2B, this can be done by concatenating a LU 220-4 to virtual volume 210-B and a LU 220-5 to volume 210-C. For that reason, additional blocks need to be allocated on RAID 250-1 and 250-2. However, as all disks of RAID 250-1 are occupied, the physical storage of LU 220-4 is allocated on a new disk 250-3. This may result in performance degradation and poor storage utilization, as a host (e.g., host 120-1) may need to access both RAID 250-1 and disk 250-3 in order to read or write a single data chunk. Another cause that may lead to fragmented volumes is the release of occupied storage space, and thus leaving "holes" in the virtual volumes. The present invention resolves the problems involved with the fragmentation of a virtual volume by providing a method that changes the topology of the storage network by migrating and combining fragments occupying part of a disk or array of disks to form a continuity of data blocks on disks, and then freeing the disks previously used by the migrated fragments. For example, in order to defragment virtual volume 210-B, the method may migrate the content of, e.g., disk E of RAID 250-1 to another disk, e.g., 250-2, and therefore freeing storage space to combine data in disk 250-3 with RAID 250-1. The result of the defragmentation of virtual volume 220-B is shown in FIG. 2C, wherein the content of disk E of RAID 250-1 is migrated to disk 250-2, and the content of disk 250-3 migrated to disk E of RAID 250-1. In one embodiment, storage space for the temporarily storing data when moving fragments from its source to destination location in the SAN may be allocated.

Figure 3:
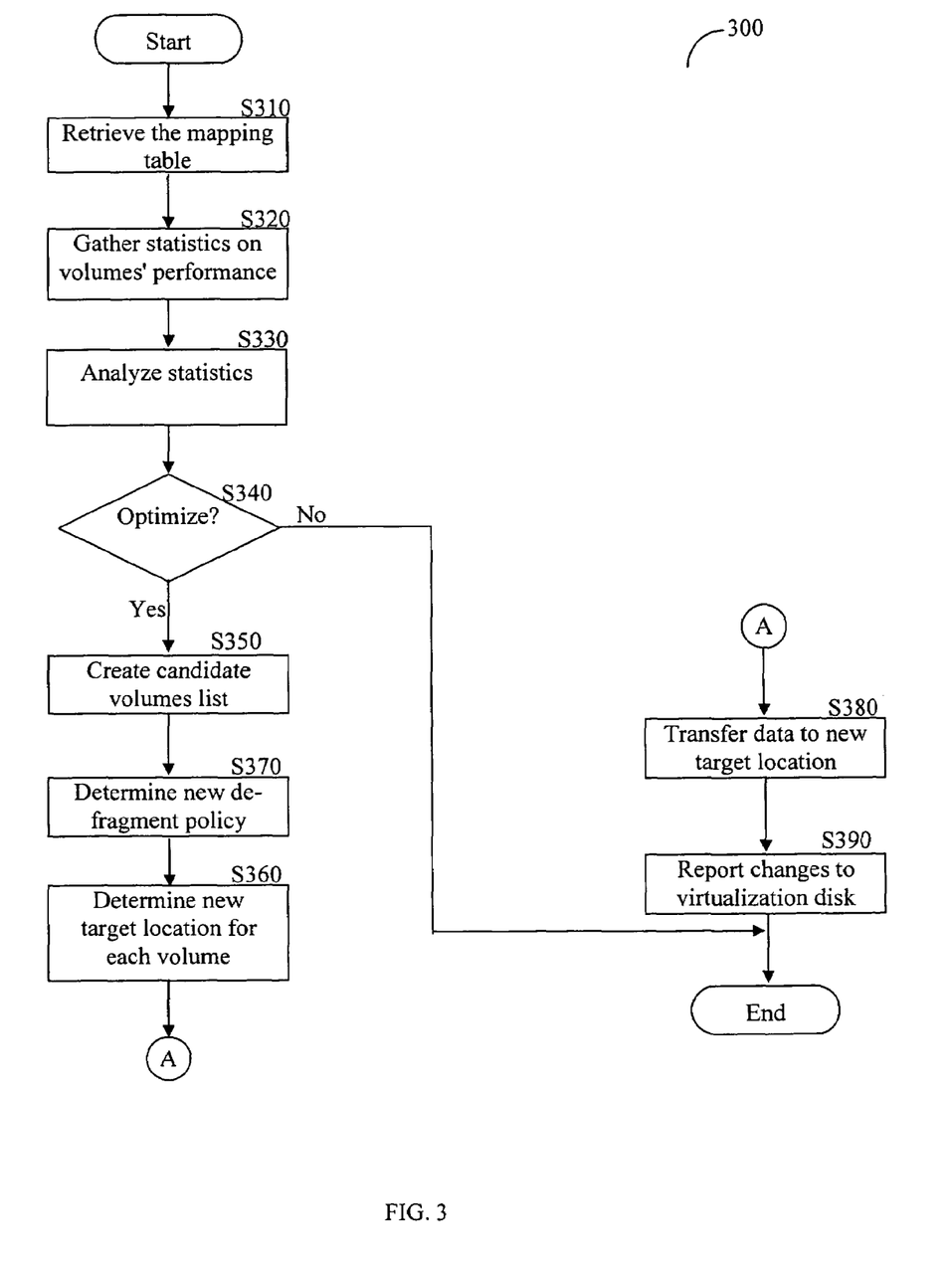

Referring to FIG. 3, a non-limiting and an exemplary flowchart 300 describing the method for performing storage defragmentation in accordance with one embodiment of the present invention is shown. The method described herein can be executed by any virtualization switch. An example for a virtualization switch capable of running the method may be found in U.S. patent application Ser. No. 10/694,115, entitled "A Virtualization Switch and Method for Performing Virtualization in the Data-Path" assigned to common assignee and which is incorporated herein by reference. Furthermore, the disclosed method is preferably executed in parallel to other processes run in the SAN. That is, in order to optimize a virtual volume, there is not a need to idle the hosts or to idle the storage arrays.

At S310, a mapping table that includes mapping information on virtual volumes and LUs to their respective storage devices is retrieved from the virtualization switch. The mapping information includes the address spaces of the virtual volumes, the LUs, the connections between the LUs and virtual volumes, the physical addresses of the actual data, the number of bytes reserved for each LU, the type of the storage device (e.g., a simple disk or a RAID) associated with each LU, and pointers to the physical storage devices. Alternatively, if the mapping table is not available in the virtualization switch, the mapping data is gathered and saved in a mapping table in the virtualization switch.

At S320, statistics regarding to the performance of each virtual volume is collected. To do this, at least one of the following attributes is determined: a) the number of I/O operations per second for each virtual volume; b) fragments in virtual volumes; c) a number of "hops" (i.e., number of routers or switches) in the path between each host and each physical storage device; and d) the class of storage (CoS) of each volume. At S330, the gathered statistics are analyzed to determine if the SAN can be optimized. For example, low performance indicates the possibility of the existence of a fragmented volume. In one embodiment statistics gathered are compared to a base-line to determine whether the virtual volumes should be optimized.

One of the parameters taken into account in the decision to perform the optimization is the class of storage (CoS). That is, if poor performance is detected in a virtual volume having a low CoS level, the method may not handle this volume. On the other hand, if a problem is encountered in a volume having a high CoS level, this volume will be handled at a higher priority. Classification of storage data and selection of whether to perform the instant method on those classifications of data may be determined by the user.

At S340, it is determined if storage optimization is required, and if so execution continues with S350; otherwise, execution terminates. At S350, a list of fragmented and un-optimized volumes (hereinafter "candidate volumes list") is created. For the purpose of the present invention, an un-optimized volume is a virtual volume that by moving its content to a different storage device the volume's performance can be improved. For example, if at S320, it is determined that the number of hops between a host and a first storage device that include an un-optimized volume is N, then the latency of I/O operations can be reduced by transferring the content of this volume to a second storage device that its number of hops is less than N. A fragmented volume is a virtual volume having its LUs are spread over one ore more disks, for example, virtual volume 210-B as shown in FIG. 2B. At S360, the de-fragmentation policy is determined. This policy defines how to handle the transformation of data blocks that belong to a volume in the volumes candidate list. For example, for each volume the policy defines which data fragments can be migrated to another location and which fragments must not be changed, the priority to handle the volume, whether or not to use a temporary storage area when transferring data, whether or not to de-fragment the volume in parallel to the execution of other services, and other parameters which may be defined by the user.

The process for determining the de-fragment policy described below with reference to FIG. 4. At S370, for each volume in the candidate volumes list, its new target location is determined. Specifically, for each LU that should be moved to a new location its physical address is computed and updated in the mapping table. The new location is determined to maximize the performance of the virtual volume and without affecting the performance of other volumes in the SAN. At S380, data blocks of each volume in the candidate volumes list are moved to its new target location according to the de-fragment policy defined for this volume.

At S390, changes made in the physical storage devices are reported to the virtualization switch that updates its mapping table. In one embodiment of the present invention the method described herein handles notifications of changes in the storage devices topology. Any changes in topological data for each LU are presented to the system administrator by means of a graphical user interface (GUI).

Figure 4:
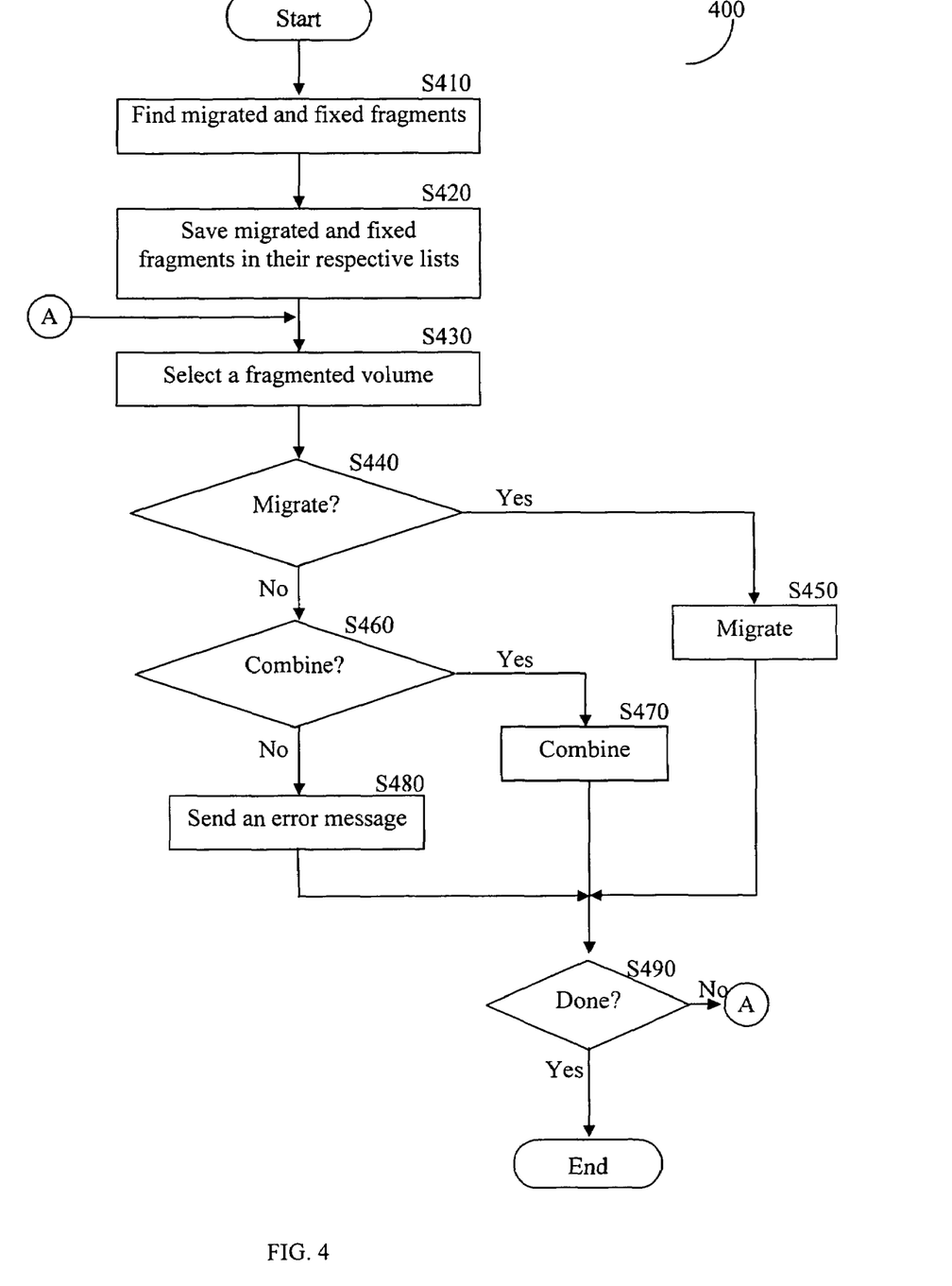

FIG. 4 provides a non-limiting and exemplary flowchart 400 describing the process for de-fragmenting fragmented volumes in accordance with one embodiment of present invention is shown. At S410, for each fragmented volume based on data kept in the mapping table it is determined which of the fragments ought to remain in their current location and which of the fragments can be migrated to another storage location. For example, the method analyzes data in the mapping table to determine which data blocks' movement to different physical location increases storage utilization and which do not. At S420, data blocks (fragments) that can be migrated are saved in a "migrated fragments list" and data blocks that cannot be moved are saved in a "fixed fragments list". Both lists are kept in the virtualization switch. At S430, a volume from the fragmented virtual volume is selected. At S440, it is checked if the migrated fragments can be migrated to the storage location of the fixed fragments, and if so execution continues with S450, where the data blocks are migrated to the storage device holding the fixed fragments, and thus forming a continues of data blocks belong to the fragment volume on the same disk or array of disks. If S440 results with a negative answer, execution continues with S460 where another check is performed to determine if the migrated fragments can be combined together to achieve better storage utilization, and if so then at S470 data blocks are merged; otherwise, at S480 a message is sent to the user indicating that the selected virtual volume cannot be de-fragmented. At S490, it is determined whether all volumes in the fragmented volumes list were handled, and if so execution ends; otherwise, execution returns to S430.

In one embodiment of the disclosed invention the methods herein may be embodied within a computer software product operable on a computer. The computer software product may contain a plurality of instructions that when executed by a system perform the methods disclosed herein. The computer software product may be provided on, but not limited to, a hard disk, a compact disk (CD), a digital video disk (DVD) and other storage media that would be known to those of skill in the art.

I claim:

1. A method for storage optimization by de-fragmenting virtual volumes of a storage area network (SAN), comprising the steps of:
   collecting statistics regarding a performance of each of a plurality of virtual volumes;
   determining which of the plurality of virtual volumes in the SAN to optimize;
   assessing a de-fragment policy for the virtual volume to be optimized by:
      determining, using a mapping table, data fragments in each logical unit to be migrated;
      determining, using the mapping table, data fragments in each LU in the virtual volume to be combined; and
      determining, using the mapping table data fragments in each LU in the virtual volume that cannot be altered;
   determining for each virtual volume to be optimized, a new target location for one or more logical units in the virtual volume; and
   transferring data blocks of the one or more logical units to the new target location.

2. The method of claim 1, wherein the step of collecting statistics comprises a step of: determining at least one of: a number of input/output operations per second for the virtual volume; fragments in the virtual volume; a number of routers and switches in the path between each host and each physical storage device; and a class of storage of the virtual volume.

3. The method of claim 2, wherein the determination step is based on at least the class of storage of the virtual volumes.

4. The method of claim 3, wherein the determination step is performed by comparing the collected statistics to a predetermined baseline value.

5. The method of claim 1, wherein the virtual volumes to be optimized are virtual volumes that can be de-fragmented.

6. The method of claim 1, wherein the data fragments are comprised of data blocks belonging to logical units of the respective virtual volumes.

7. The method of claim 1, wherein the mapping table includes mapping information on virtual volumes and logical units to their respective physical storage devices.

8. The method of claim 1, wherein determining the new target location for each logical unit in the virtual volume comprises:
   computing a physical address of the new location target; and updating the mapping table with the computed physical address.

9. A computer readable storage medium for storing a code executed by a computer, said code enabling data storage optimization by de-fragmenting virtual volumes of a storage area network, and performing the steps of:
   collecting statistics regarding to a performance of each of the virtual volumes;
   determining which of the virtual volumes in the SAN to optimize;
   assessing a de-fragment policy for the virtual volume to be optimized by:
      determining, using a mapping table, data fragments in each logical unit to be migrated;
      determining, using the mapping table, data fragments in each LU in the virtual volume to be combined; and
      determining, using the mapping table data fragments in each LU in the virtual volume that cannot be altered;
   determining for each virtual volume to be optimized a new target location for each logical unit in the virtual volume; and
   transferring data blocks of the logical unit to the new target location.

10. The computer readable storage medium of claim 9, wherein collecting the statistics comprises a step of: determining at least one of: a number of input/output (I/O) operations per second for the virtual volume; fragments in the virtual volume; a number of routers and switches in a path between each host and each physical storage device; and a class of storage of the virtual volume.

11. The computer readable storage medium of claim 10, wherein the determination step is based on at least the class of storage of the virtual volumes.

12. The computer readable storage medium of claim 11, wherein the determination step is performed by comparing the collected statistics to a predetermined baseline value.

13. The computer readable storage medium of claim 9, wherein the virtual volumes to be optimized are virtual volumes that can be de-fragmented.

14. The computer readable storage medium of claim 9, wherein the data fragments are comprised of data blocks belonging to logical units of respective virtual volumes.

15. The computer readable storage medium of claim 9, wherein the mapping table includes mapping information on virtual volumes and logical units to their respective physical storage devices.

16. The computer readable storage medium of claim 9, wherein determining the new target location for each logical unit in the virtual volume comprises:
computing a physical address of the new location target; and
updating the mapping table with the computed physical address.

17. A virtualization switch in combination with a storage area network and capable of optimization virtual volumes in the storage area network, the virtualization switch comprising:
software instructions
a memory for maintaining at least a mapping table;
a storage communication means for communicating with a plurality of physical storage devices;
a network communication means for communicating with a plurality of hosts over a network; and
a processor for executing said software instructions adapted to enable the virtualization switch to perform the operations of:
collecting statistics regarding to a performance of each of the virtual volumes;
determining which of the virtual volumes in the storage area network to be optimized;
assessing a de-fragment policy for the virtual volume to be optimized by:
determining, using a mapping table, data fragments in each logical unit to be migrated;
determining, using the mapping table, data fragments in each LU in the virtual volume to be combined; and
determining, using the mapping table data fragments in each LU in the virtual volume that cannot be altered;
determining for each virtual volume to be optimized a new target location for each logical unit logical unit in the virtual volume; and
transferring data blocks of the logical unit to the new target location.

18. The virtualization switch of claim 17, wherein collecting the statistics comprises a step of determining at least one of: a number of input/output (I/O) operations per second for the virtual volume; fragments in the virtual volume; a number of routers and switches in a path between each host and each physical storage device; and a class of storage of the virtual volume.

19. The virtualization switch of claim 18, wherein the determination on the virtual volumes to be optimized is based on at least the class of storage of the virtual volumes.

20. The virtualization switch of claim 19, wherein the determination step is performed by comparing the collected statistics to a predetermined baseline value.

21. The virtualization switch of claim 17, wherein the virtual volumes to be optimized are virtual volumes that can be de-fragmented.

22. The virtualization switch of claim 17, wherein the data fragments comprise data blocks belonging to logical units of respective virtual volumes.

23. The virtualization switch of claim 17, wherein the mapping table includes mapping information on virtual volumes and logical units to their respective physical storage devices.

24. The virtualization switch of claim 17, wherein determining the new target location for each logical unit in the virtual volume comprises:
computing a physical address of the new location target; and
updating the mapping table with the computed physical address.

25. The virtualization switch of claim 17, wherein the physical storage device comprises at least one of: a tape drive, a tape library, an optical drive, a disk, redundant array of independent disks (RAID).

26. The virtualization switch of claim 17, wherein the network comprises at least one of: a local area network (LAN), a wide area network (WAN).

* * * * *